3,023,141
METHOD OF FORMING A MINERAL WOOL PAD
Frederick J. Hartwig, Alliance, Ohio, assignor to The Babcock & Wilcox Company, New York, N.Y., a corporation of New Jersey
No Drawing. Filed Dec. 30, 1955, Ser. No. 556,463
4 Claims. (Cl. 162—152)

This invention relates to blankets or pads formed of mineral wool fibers and, more particularly, to a novel method of forming such pads or blankets involving dispersion of the fibers in an oil and water emulsion containing a cation active agent. The minerals commonly employed for the manufacture of mineral wool are natural "wool rock" (calcareous shale or argilaceous limestone), common shale, and combinations of calcareous and siliceous materials, such as metallurgical furnace slag. All such materials have a fusion point in the range of 1500–2500° F. Where the raw material has a fusion temperature in the higher portion of this range, it is customary to add varying amounts of a fluxing material, such as limestone, dolomite, fluorspar, or feldspar, to lower the fusion point of the mixture to the desired value.

One of the principal uses of mineral wool of the character described is for heat insulation. The upper use temperature limit for such material is determined by the temperature at which recrystallization occurs therein to an extent that embrittlement and loss of strength in the fibers result. At this temperature, known as the "devitrification" temperature, the material changes from a glassy to a crystalline structure. Tests of the best known commercial brands of mineral wool have shown none in satisfactory condition after a twenty-four hour exposure at 1350° F. due to excessive recrystallization at that temperature. The manufacturers' recommended upper use temperature limits for these mineral wools are therefore in the range of 900–1200° F.

The mineral wool is formed by melting the starting material which may be initially in the form of pieces of grog or clinker made from calcining the raw material to eliminate the water. The molten material is withdrawn from the furnace as a stream or a series of droplets and subjected to a high velocity jet of air or steam which blows the droplets into fibers.

As disclosed in Patent No. 2,467,889, a mineral wool having an upper use temperature limit in the range of 1500–2300° F. can be formed by using kaolin as a starting material. Kaolins have a fusion point of about 3245° F. and one Georgia kaolin, for example, has a chemical analysis of approximately

| | Percent |
|---|---|
| Silica | 45.30 |
| Alumina | 39.14 |
| Titanium oxide | 1.54 |
| Iron oxide | 0.27 |
| Lime | 0.13 |
| Magnesia | 0.04 |
| Potash | 0.15 |
| Soda | 0.10 |
| Ignition loss | 13.71 |

While the invention is broadly applicable to pads or blankets formed of any mineral or glass wool, the description will, by way of referring to a specific exemplification, have particular references to mineral wool formed from kaolin, or "kaolin wool."

Pads of blankets of mineral wool are formed by compressing a fluffy mass of mineral wool fibers to a desired thickness. Such compression may be effected, for example, by feeding the fluffy mass between squeeze rolls, by compressing the fluffy mass between two conveyors, by clamping the fluffy mass between two plates, by rolling a mandrel over the fluffy mass, or by other known techniques. However, one difficulty encountered in this compressing the fibers is due to the brashness of the fibers, which characteristic results in resistance of the fibers to movement over each other during the compression. By "brashness," as used herein, is meant a characteristic rough "feel" of the fibers, which may possibly be accompanied by some inherent brittleness.

A pad or blanket can also be formed from loose organic fibers by felting the fibers. In this case, the fibers are dispersed in water or other liquid and run into a tank above a perforated plate or screen. As the water is drained off a well-knit pad is formed by the randomly disposed and interknit fibers remaining on the screen. As most inorganic mineral and glass wool fibers, including kaolin wool, are wetted by water, the felting process of forming pads or blankets has not been readily applicable to the formation of pads or blankets from long inorganic fibers. When mineral wool fibers are dispersed in water, they ball together, probably due to the surface tension of the water drawing the fibers toward each other. As proper felting requires that the fibers remain separated at random relative orientations, thus balling of the fibers inhibits dispersion and the resulting pad is not uniform in thickness and density.

In accordance with the present invention, it has been found that a compact well-bonded, blanket or pad exhibiting good coherence and strength, can be readily, easily, and economically formed by first coating the fibers with a lubricant, then compacting the fibers to form a pad, then, while the fibers are still held in compacted relation, applying heat to drive off the coating, and then releasing the compacting pressure from the fibers. A preferred coating for the fibers is an oil-water emulsion containing a very small percentage of an agent which, in solution in the oil, coats the fibers preferentially to water. In forming the pad by felting, the fibers are coated with the lubricant before the felting step. After the felting has been effected by screening off the water, a well interlocked fibrous pad or blanket remains. The pad or blanket is then dried, after which it is relatively highly heated to burn off the agent and any of the remaining fractions of the oil.

In both modes of pad formation, the compacted fibers, with the lubricant coating removed, remain interlocked due to their brashness and increased curliness resulting from relaxation of strain incurred during formation of the fibers, thus providing a well-bonded, very strong, and easily handled pad or blanket of inorganic glass or mineral wool fibers.

The invention treatment is applicable to any inorganic fibrous material and with any method of applying the emulsion, as by spraying, painting, dipping, etc. However, it is more particularly effective with siliceous fibers.

The preferential coating agent is of the general class known as cation-active agents. Examples of such agents are the fatty acid amine salts, wherein the amine end of the molecules adhere to the siliceous fibers and the other ends of the molecules are hydrocarbons pointing away from the fibers and acting both as lubricants and water-repellents. Some of the silicones are equally effective but more expensive than the fatty acid amine salts.

The term "cation-active agent" designates one of three groups of surface-active agents consisting of a long hydrocarbon chain and a hydrophilic group in the same molecule, these three groups being (1) anion-active agents, (2) cation-active agents, and (3) non-ionic surface-active agents. In a cation-active agent, the hydrophilic group is electro-valent and the hydrocarbon group is part of the positive component when the compound ionizes. As cation-active agents are positive, they are readily attracted to and held by negatively charged surfaces.

The "fatty amines," which are cation-active agents, are substituted ammonias derived from fatty acids by conversion of the acids to nitriles followed by catalytic hydrogenation of the nitriles to amines. Chemically, they are normal aliphatic amines whose alkyl groups contain 8 to 22 carbon atoms arranged as a normal or unbranched carbon chain.

Two examples of fatty amines found particularly useful in the present invention are those known commercially as "Armac HTD" and "Arquad S-2C." The first is a primary aliphatic amine acetate derived from hydrogenated tallow fatty acids, and the second is a quaternary ammonium chloride which is a 50% active mixture of soya trimethyl ammonium chloride and di-coconut dimethyl ammonium chloride.

In practicing the invention, the cation-active agent, such as a fatty amine, is dissolved in any inexpensive petroleum, such as kerosene or #3 fuel oil for example, in the ratio of five (5) parts of oil to one (1) part of cation-active agent. When the solution of oil and cation-active agent is mixed with water, there is formed a milky white, very persistent emulsion. For the purposes of the invention, it has been found that the concentration of the cation-active agent in the emulsion can be as little as 0.001% or ten (10) parts of cation-active agent in a million parts of water.

The fibers coated with this emulsion are suitably compacted in any desired manner and, while held compacted, dried and heated to 1000° F. to burn out the lubricant and the cation-active agent. When the pressure is released, the fibers will no longer relatively slide on each other so that the pad or blanket remains substantially in its compressed condition.

While specific materials and procedures have been mentioned by way of illustrative examples, the basic principle of the invention is that if inorganic wool fibers are thoroughly and completely waterproofed and lubricated in any manner, and then placed in water, they will disperse. This dispersion prevents matting and tangling of the fibers so that they can be smoothly distributed to form mats, pads or blankets, or can be pumped as a slurry. The lubrication of the fibers permits their ready compaction under pressure to form pads which, if held compressed while the lubricant is burned out, will retain substantially their compacted shape by the frictional and physical interlocking of the fibers.

While specific embodiments of the invention have been shown and described in detail to illustrate the application of the invention principles, it will be understood that the invention may be embodied otherwise without departing from such principles.

What is claimed is:

1. The method of forming a mineral wool pad which comprises coating mineral wool fibers with a liquid lubricant consisting of petroleum oil and water held in a stable emulsion by a cation-active agent having good oil dispersing properties, pressure compacting a mass of random oriented lubricated fibers into an interlocked fibrous pad of predetermined cross-sectional shape, heating the fibers while held so compacted to a temperature sufficient to burn off substantially all of the oil and cation-active agent from the fibers, and thereafter releasing the compacting pressure from the fibers to permit the pad to retain substantially its compacted shape substantially solely by the physical interlocking of the fibers.

2. The method as claimed in claim 1 in which the cation-active agent is a fatty amine salt.

3. The method as claimed in claim 1 in which the pad is formed of kaolin wool fibers having an upper use temperature limit in the range of 1500°–2300° F.

4. The method as claimed in claim 3 in which the temperature to which the pad is heated is of the order of 1000° F.

References Cited in the file of this patent

UNITED STATES PATENTS

| | | |
|---|---|---|
| 1,907,616 | Tucker | May 9, 1933 |
| 2,220,386 | Badollet | Nov. 5, 1940 |
| 2,335,102 | Bergin | Nov. 23, 1943 |
| 2,389,875 | Senkus | Nov. 27, 1945 |
| 2,626,213 | Novak | Jan. 20, 1953 |
| 2,652,325 | Novak | Sept. 15, 1953 |
| 2,690,426 | Jefferson | Sept. 28, 1954 |
| 2,698,558 | Hawley | Jan. 4, 1955 |
| 2,699,097 | Binkley | Jan. 11, 1955 |
| 2,723,959 | Jacoby | Nov. 15, 1955 |
| 2,745,173 | Janos | May 15, 1956 |
| 2,758,026 | Landes | Aug. 7, 1956 |
| 2,802,734 | Bandel | Aug. 13, 1957 |